(12) United States Patent
Bell et al.

(10) Patent No.: US 10,684,491 B2
(45) Date of Patent: Jun. 16, 2020

(54) METHOD AND SYSTEM USING REFRACTIVE BEAM MAPPER HAVING SQUARE ELEMENT PROFILES TO REDUCE MOIRE INTERFERENCE IN A DISPLAY SYSTEM INCLUDING MULTIPLE DISPLAYS

(71) Applicant: PURE DEPTH LIMITED, Auckland (NZ)

(72) Inventors: Gareth P. Bell, Auckland (NZ); Darryl Singh, Auckland (NZ)

(73) Assignee: Pure Depth Limited (NZ)

( * ) Notice: Subject to any disclaimer, the term of this patent is extended or adjusted under 35 U.S.C. 154(b) by 286 days.

(21) Appl. No.: 15/409,711

(22) Filed: Jan. 19, 2017

(65) Prior Publication Data

US 2017/0131558 A1    May 11, 2017

Related U.S. Application Data

(63) Continuation-in-part of application No. 15/283,621, filed on Oct. 3, 2016.

(60) Provisional application No. 62/281,037, filed on Jan. 20, 2016, provisional application No. 62/280,993, filed on Jan. 20, 2016, provisional application No. 62/236,776, filed on Oct. 2, 2015.

(51) Int. Cl.
| | | |
|---|---|---|
| *G02B 30/52* | (2020.01) | |
| *G02B 27/09* | (2006.01) | |
| *H04N 13/305* | (2018.01) | |
| *H04N 13/395* | (2018.01) | |
| *G02B 30/27* | (2020.01) | |

(52) U.S. Cl.
CPC ......... *G02B 30/52* (2020.01); *G02B 27/0927* (2013.01); *G02B 27/0961* (2013.01); *G02B 30/27* (2020.01); *H04N 13/305* (2018.05); *H04N 13/395* (2018.05); *H04N 2213/001* (2013.01)

(58) Field of Classification Search
None
See application file for complete search history.

(56) References Cited

U.S. PATENT DOCUMENTS

| | | |
|---|---|---|
| 6,909,556 B2 | 6/2005 | Berman et al. |
| 7,347,558 B2 | 3/2008 | Berman |
| 8,159,739 B2 | 4/2012 | Woodgate et al. |

(Continued)

FOREIGN PATENT DOCUMENTS

| | | |
|---|---|---|
| EP | 1983363 | 10/2008 |
| JP | Hei 2 251902 | 1/1990 |

(Continued)

OTHER PUBLICATIONS

U.S. Appl. No. 62/280,993, filed Jan. 20, 2016; Bell et al.

(Continued)

*Primary Examiner* — Dakshesh D Parikh
(74) *Attorney, Agent, or Firm* — Craig A. Baldwin

(57) ABSTRACT

A multi-display system (e.g., a display including multiple display panels) includes at least first and second displays (e.g., display panels or display layers) arranged substantially parallel to each other in order to display three-dimensional (3D) features to a viewer(s). An optical element(s) such as at least a refractive beam mapper (RBM) is utilized in order to reduce moiré interference.

17 Claims, 13 Drawing Sheets
(11 of 13 Drawing Sheet(s) Filed in Color)

(56) References Cited

U.S. PATENT DOCUMENTS

| | | | |
|---|---|---|---|
| 8,177,408 B1 | 5/2012 | Coleman | |
| 2002/0034710 A1 | 3/2002 | Morris et al. | |
| 2002/0176037 A1 | 11/2002 | Li | |
| 2004/0130790 A1* | 7/2004 | Sales | G02B 3/0043 359/619 |
| 2006/0103951 A1 | 5/2006 | Bell et al. | |
| 2006/0203338 A1* | 9/2006 | Pezzaniti | G02B 27/26 359/465 |
| 2006/0290594 A1 | 12/2006 | Engel et al. | |
| 2009/0231698 A1* | 9/2009 | Hashimoto | B60K 35/00 359/476 |
| 2011/0188134 A1 | 8/2011 | Bell et al. | |
| 2011/0216555 A1* | 9/2011 | Wei | F21V 7/04 362/608 |
| 2013/0176725 A1 | 7/2013 | Hajjar et al. | |
| 2014/0211128 A1 | 7/2014 | Yang et al. | |
| 2015/0323805 A1 | 11/2015 | Bell | |
| 2016/0012630 A1 | 1/2016 | Bell | |

FOREIGN PATENT DOCUMENTS

| | | |
|---|---|---|
| JP | 2006-500621 | 1/2006 |
| JP | 2011-504641 | 2/2011 |
| KR | 10-2008-0059382 | 6/2008 |
| WO | WO 2007/108162 | 9/2007 |
| WO | WO 2012/112856 | 8/2012 |

OTHER PUBLICATIONS

U.S. Appl. No. 15/283,525, filed Oct. 3, 2016; Bell et al.
U.S. Appl. No. 15/281,381, filed Sep. 30, 2016; Bell et al.
U.S. Appl. No. 15/283,621, filed Oct. 3, 2016; Bell et al.
Sales et al., "LED Illumination Control and Color Mixing with Engineered Diffusers", Proceedings of SPIE, vol. 5530, Oct. 20, 2004, pp. 133-140.
Anonymous: "Optical Diffuser Technologies"; Mar. 3, 2015, XP055585047, RPC Photonics.
Anonymous: Product Specifications Liquid 7 Crystal Displays Group LQ10D421 TFT-LCD Module, Aug. 28, 2006, XP055585066.
Korean Office Action dated Jun. 14, 2019 for KR Application No. 10-2018-7023395.
Fred Dickey et al., Engineered Microlens Diffusers: Theory and Techniques, $2^{nd}$ Edition, Jul. 15, 2014. CRC Press, XP055614656, pp. 367-403.
Dan Daly, "Improvements to the Performance of Microlens Arrays"; Jan. 1, 2001, In: Microlens Arrays, XP055614735, pp. 78-81.
JP Office Action dated Jul. 31, 2019 for JP Office Action No. 2018-537749.

* cited by examiner

METHOD AND SYSTEM USING REFRACTIVE BEAM MAPPER HAVING SQUARE ELEMENT PROFILES TO REDUCE MOIRE INTERFERENCE IN A DISPLAY SYSTEM INCLUDING MULTIPLE DISPLAYS

This application is a continuation-in-part (CIP) of U.S. patent application Ser. No. 15/283,621, filed Oct. 3, 2016, and this application is related to and claims priority on each of provisional U.S. Patent Application Nos. 62/281,037, filed Jan. 20, 2016 (Our Ref. 6468-16); 62/280,993, filed Jan. 20, 2016 (Our Ref. 6468-17); and 62/236,776, filed Oct. 2, 2015 (Our Ref. 6468-8), all of which are hereby incorporated herein by reference in their entireties.

FIELD OF THE INVENTION

This invention relates to a multi-display system (e.g., a display including multiple display panels/display layers), where at least first and second displays (e.g., display panels or display layers) are arranged substantially parallel to each other in order to display three-dimensional (3D) features to a viewer(s). Thus, this invention relates generally to displays and, more particularly, to display systems and methods for displaying three-dimensional features.

BACKGROUND AND SUMMARY OF THE INVENTION

Traditionally, displays present information in two dimensions. Images displayed by such displays are planar images that lack depth information. Because people observe the world in three-dimensions, there have been efforts to provide displays that can display objects in three-dimensions. For example, stereo displays convey depth information by displaying offset images that are displayed separately to the left and right eye. When an observer views these planar images they are combined in the brain to give a perception of depth. However, such systems are complex and require increased resolution and processor computation power to provide a realistic perception of the displayed objects.

Multi-component displays including multiple display screens in a stacked arrangement have been developed to display real depth. Each display screen may display its own image to provide visual depth due to the physical displacement of the display screens. For example, multi-display systems are disclosed in U.S. Patent Publication Nos. 2015/0323805 and 2016/0012630, the disclosures of which are both hereby incorporated herein by reference.

When first and second displays or display layers are conventionally stacked on each other in a multi-display system, moire interference occurs. The moire interference is caused by interactions between the color filters within the layers when projected onto a viewer's retina. For example, when green color filters overlap, light is transmitted making for a comparative bright patch. When a green filter is over say a red filter, not as much light will be transmitted making for a dark region. Since the rear and front displays or display layers have slightly different sizes when projected onto the retina, the pixels will slowly change from being in phase to out of phase. This has the effect of producing dark and bright bands otherwise known as moire interference.

Certain example embodiments of the instant invention provide solution(s) that make moiré interference in MLD systems vanish or substantially vanish, but without significantly sacrificing the rear display resolution and contrast. In certain example embodiments of this invention, the MLD system includes first and second displays. A refractive beam mapper (RBM) may be utilized in order to reduce or eliminate moire interference. It has been found that square profile diffuser elements improve image quality in such MLD systems.

In example embodiments of this invention, there is provided a display device comprising: a first display in a first plane for displaying a first image; a second display in a second plane for displaying a second image, wherein said first and second planes are approximately parallel to each other; a beam mapping element located between the first and second displays and comprising a plurality of microlenses configured to direct rays output from the second display through sub-pixels of the first display and toward a viewer, wherein the microlenses each have a substantially square profile as viewed from above in order to improve image quality.

In example embodiments of this invention, there is provided a display device comprising: a first display in a first plane for displaying a first image; a second display in a second plane for displaying a second image, wherein said first and second planes are approximately parallel to each other; and a beam mapping element (e.g., refractive beam mapper) located between the first and second displays and comprising a plurality of microlenses configured to direct incident rays from the second display in a pseudo random manner through sub-pixels of the first display and toward a viewer.

In certain example embodiments of this invention, there is provided display device comprising: a first display in a first plane for displaying a first image; a second display in a second plane for displaying a second image, wherein said first and second planes are approximately parallel to each other; a refractive beam mapper located between the first and second displays and comprising an array of beam mapping elements configured to direct rays output from the second display through sub-pixels of the first display and toward a viewer, wherein the beam mapping elements each have a substantially square profile.

A refractive beam mapper may or may not be used in combination with other techniques for reducing moire interference (e.g., color filter offset or dissimilar color filter patterns on the respective displays, diffuser techniques, and/or subpixel compression) in various embodiments of this invention.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

These and other features and advantages may be better and more completely understood by reference to the following detailed description of exemplary illustrative embodiments in conjunction with the drawings, of which.

DETAILED DESCRIPTION

This invention relates to a multi-display system (e.g., a display including multiple display panels), where at least first and second displays (e.g., display panels or display layers) are arranged substantially parallel to each other in order to display three-dimensional (3D) features to a viewer (s). The displays may be flat or curved in different embodiments. Thus, embodiments of this invention relate generally to displays and, more particularly, to display systems and methods for displaying three-dimensional features. MLDs according to example embodiments of this invention may be used, for example, as displays in vehicle dashes in order to provide 3D images (e.g., for speedometers, vehicle gauges, vehicle navigation displays, etc.).

The color moiré interference problem is caused by the pattern regularity of both liquid crystal display (LCD) color filter arrays as, for example, RGB pixels are aligned into RGB columns in both displays of a MLD system. Color moiré interference may be largely prevalent in the horizontal direction.

Figure 1:
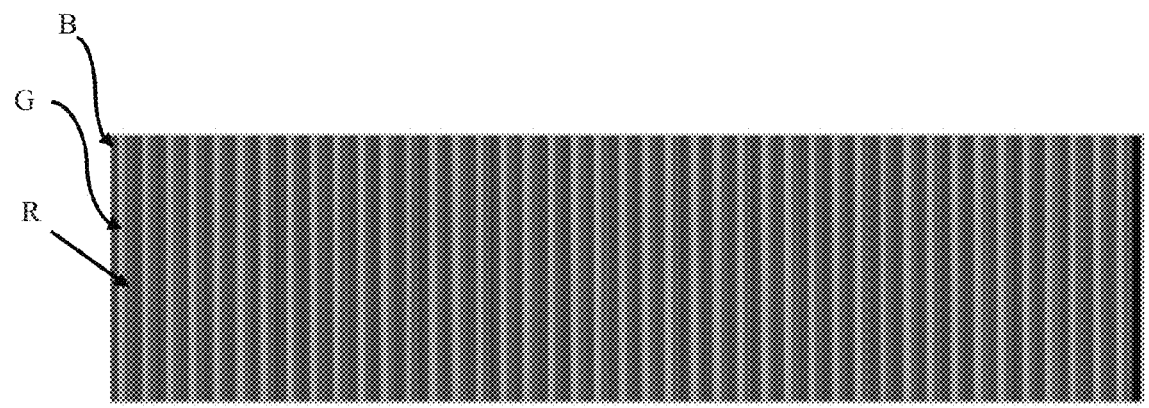
FIG. 1 is a top plan view of color filters of a liquid crystal display (LCD) where pixels are the same color in each column (or row)
Figure 2:
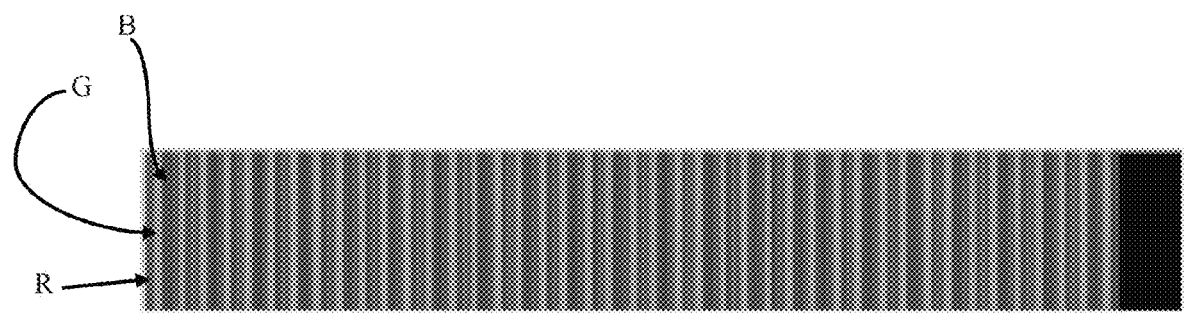
FIG. 2 is a top plan view of color filters of another liquid crystal display (LCD) where pixels are the same color in each column (or row)
Figure 3:
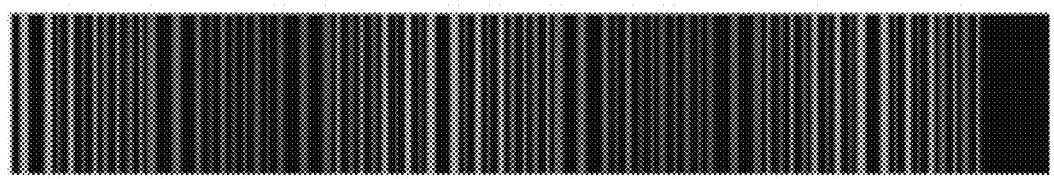
FIG. 3 is a top plan view of a MLD system resulting from the combination of LCDs of FIGS. 1 and 2 where the LCD of FIGS. 1 and 2 are overlapped with each other in a stacked relationship, which results in moire interference.

FIGS. 1-3 illustrate an arrangement in a MLD system which experiences moire interference. FIG. 1 is a top plan view of color filters/pixels of a first liquid crystal display (LCD) where pixels or subpixels are the same color in each column. In particular, FIG. 1 shows a LCD having a conventional red-green-blue (R-G-B) repeating pattern or arrangement, wherein the pixels or subpixels are the same color in each column. Starting from the left side of FIG. 1, the color filter stripes are arranged in vertical lines in a BGR order, and this BGR order repeats itself over and over moving from left to right across the display of FIG. 1. Thus, the pattern in the display or display layer of FIG. 1 includes blue columns, green columns, and red columns. The green (G) columns are located between blue (B) and red (R) colored columns. A subpixel may be considered the area of a given pixel electrode in an area of a particular color filter. For instance, R, G and B subpixels may make up a pixel. Alternatively, a subpixel may be considered to be a pixel. FIG. 1 is shown without color mask rotation. Conventionally, both panels of a multiple layered display (MLD) may be configured similarly with such a R-G-B arrangement. The repeatable pattern may be R-G-B, or R-B-G, or any other combination.

Likewise, FIG. 2 is a top plan view of color filters/pixels/subpixels of a second LCD where pixels or subpixels are also the same color in each column. Starting from the left side of FIG. 2, the color filter stripes are arranged in vertical lines in a RGB order, and this order repeats itself over and over moving from left to right across FIG. 2. The repeatable pattern may be R-G-B, or R-B-G, or any other combination involving these colors. As shown in FIG. 2, like in FIG. 1, green (G) columns are located between blue (B) and red (R) colored columns.

FIG. 3 is a top plan view of a MLD system resulting from the combination of the LCDs of FIGS. 1 and 2, one on top of the other in a stacked overlapping relationship in a MLD system. FIG. 3 shows the mixing of the color filter and pixel/subpixel patterns shown in FIGS. 1 and 2. In particular, FIG. 3 illustrates the emergence of moiré interference given an instance where both LCDs have a similar R-G-B column arrangement, where the pixels are the same color in each column. For example, when the FIG. 2 pattern overlaps the FIG. 1 pattern in a MLD system, green color filter lines overlap (e.g., see the left portion of FIG. 3), and light in this green filter line overlap area is transmitted through the MLD system making for a comparatively bright green patch. When a green filter overlaps a red filter for instance (or a blue filter is over a red filter), not as much light will be transmitted making for a dark region (e.g., see the dark regions surrounding the green stripe at the left side of FIG. 3). Since the rear and front displays or display layers have slightly different sizes when projected onto a retina, the pixels will slowly change from being in phase to out of phase. This has the effect of producing dark and bright bands otherwise known as moire interference.

Embodiments of this invention address, and reduce or solve, this moire interference problem. Certain example embodiments of the instant invention provide solution(s) that make moiré interference in MLD systems vanish or substantially vanish, but without significantly sacrificing the rear display resolution and contrast.

In certain embodiments of this invention, a beam mapping element such as diffractive optical element (DOE) or a refractive beam mapper (RBM) composed of many micro-lenses may be used to reduce moire interference. When an RBM is used, pseudo random mapping may be provided in order to not introduce extra moiré effects. The divergence of individual beams may be limited so that any point on the rear LCD is not diverted more than one pixel distance from a straight line by the time it reaches the front LCD in certain example embodiments. One may also laminate such a beam mapping element to the front display and optically match the media between the two LCDs with a non-birefringent material in certain example embodiments, and such embodiments may or may not be used in combination with subpixel compression techniques discussed herein.

Displays or display layers herein (e.g., see front display 1 and rear display 2 in FIG. 6, or the corresponding displays in FIGS. 4, 5, 7, 14-16) may be LCDs, OLEDs, or the like. Twisted nematic (TN) LCDs may follow a fairly generic pixel layout, such as a square divided into three portions running horizontally (or vertically) with red green and blue sub-pixels. The sub-pixels may be separated by a black mask in the horizontal and vertical directions. There is often a square protrusion in the corner of the sub-pixel to cover the drive transistor. There are several different types of pixel technology that enable wide screen viewing and temporal performance required for modern desktop monitors and televisions. Embodiments of the present invention are compatible with all of these LCDs, since the backplanes are designed to follow the basic RGB stripe pixel layout. As such, the backplane layout required for each pixel not need to change. For example, pixel type displays by manufacturer include: Panasonic (IPS Pro), LG Display (H-IPS & P-IPS), Hannstar (S-IPS), AU Optronics (A-MVA), Samsung (AFFS), S-LCD (S-PVA), and Sharp Corporation (ASV and MVA). In certain embodiments, both displays or display layers may be OLEDs, or one display may be an OLED and the other an LCD. Note that in OLEDs, respective sub-pixels or pixels would be filled with red, green, and blue material as the color filter material (as opposed to having LCD type color filters).

Figure 5:
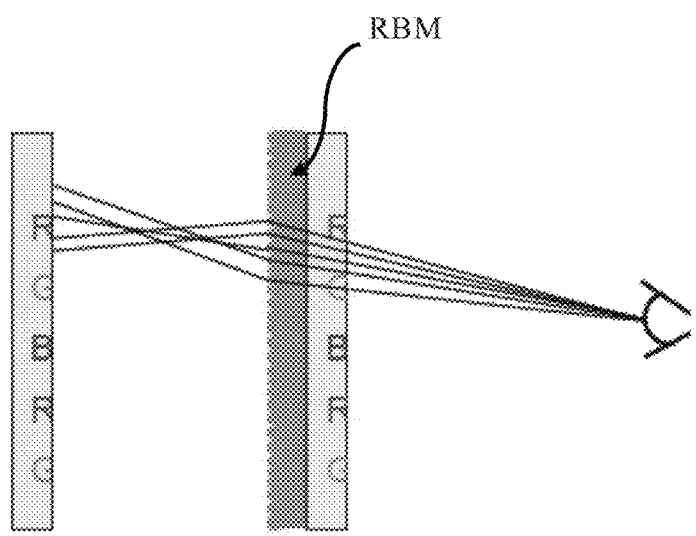
FIG. 5 is a schematic diagram illustrating a mapping element that may be used in connection with the pseudo random mapping of FIG. 4 in order to reduce moire interference (this may or may not be used in combination with sub-pixel compression embodiments in various embodiments of this invention)
Figure 6:
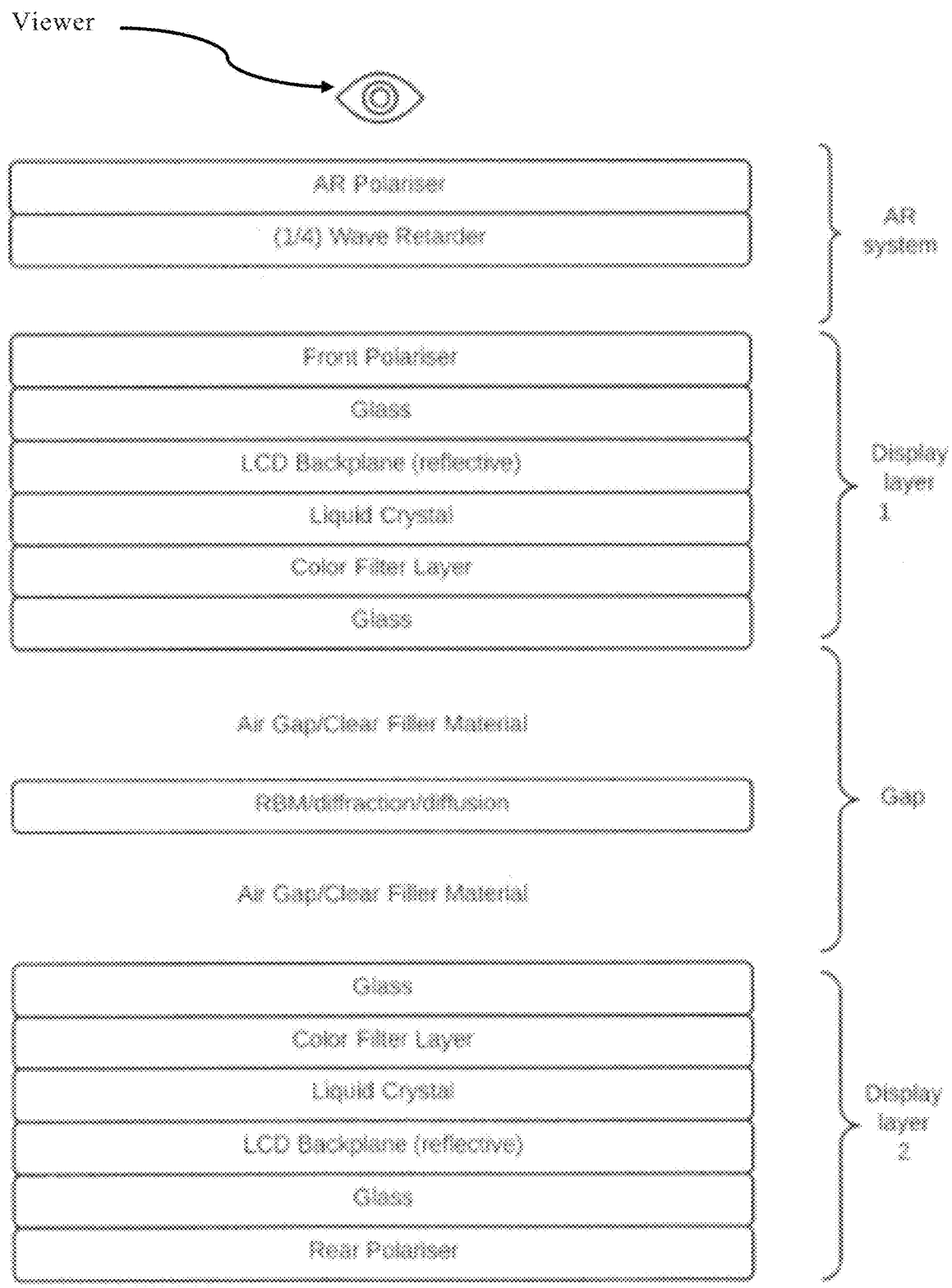
FIG. 6 is a schematic side cross sectional view of a MLD according to an example embodiment of this invention, which may be used with the embodiments of any of the figures herein.

FIG. 6 illustrates a MLD according to an example embodiment of this invention, in which the stacked overlapping layers/displays of any of the figures herein may be provided and utilized. For example, the displays shown in any of FIGS. 4-5 and 14-16 may be the front 1 and rear 2 displays in FIG. 6, respectively. The first display or display layer of the MLD may be element 1 (or 2), and the second display or display layer of the MLD may be element 2 (or 1). Display or display layer 2 is closest to the backlight of the MLD, and it may be desirable to have its backplane facing the backlight system to recycle light that may pass through row drivers, column drivers, transistors, and storage capacitance lines into the backlight. A two polarizer configuration may be used, as shown in the figure, and gaps may be designed to include air or material having birefringence designed to maintain black state of the display when desired. The gap may include material having a refractive index matched closely to glass or the layers on either side to reduce internal reflection and/or depolarization effects. For the front display or display layer 1, its backplane may be oriented opposite to that of display or display layer 2. In particular, for the front display 1 its backplane may be oriented to face the viewer to reduce internal reflections. Thus, it can be seen in FIG. 6 that the color filter layers (each of which may be made up of one or more layers) of the respective displays 1 and 2 may be designed to face each other, with no liquid crystal layer from either display being located between the color filter layers of the first and second displays in certain example embodiments. In certain example embodiments, to reduce external reflections of ambient light, there may be provided an antireflective system at the front such as that shown in FIG. 6 made up of quarter wave retarder and an antireflective polarizer, so that ambient light that would normally be reflected would undergo a quarter wave rotation on the first pass through the AR polarizer, is reflected by the backplane elements, undergoes a second rotation through the quarter wavelength retarder. By the time it goes through this second rotation, it is substantially orthogonal to the transmission axis of the AR polarizer and thus will be substantially absorbed. Additionally, black mask (BM) or other non-reflective material may be added behind the conductive traces of the displays to reduce reflections. Additionally, antireflective (AR) coating(s) may be applied to the interior surfaces in certain example embodiments of this invention. The AR coating may, for example, operate in the visible range, e.g., moth eye, single layer interference, multi-layer interference, etc.

Figure 4:
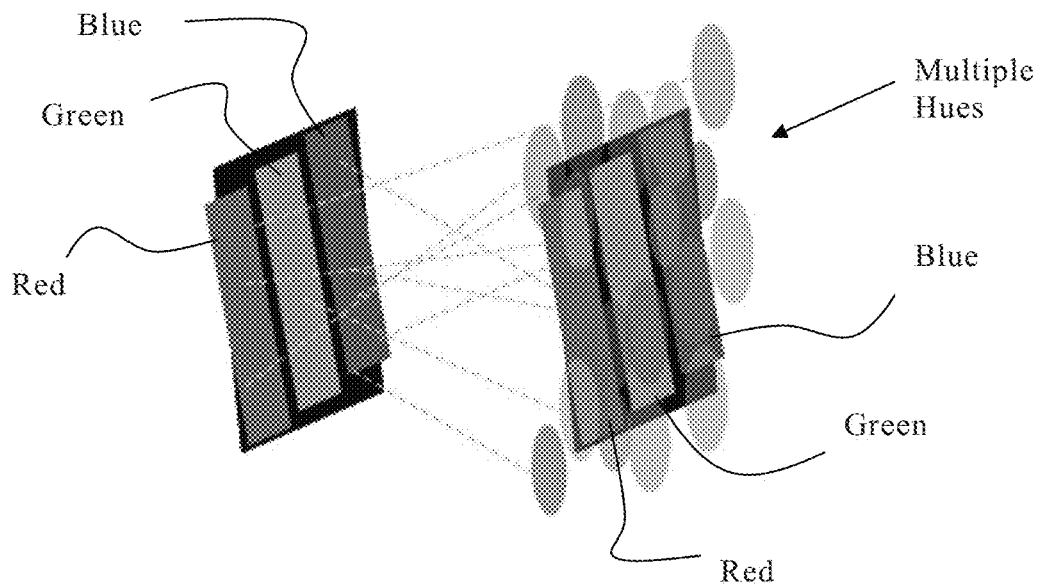
FIG. 4 is a schematic diagram illustrating pseudo random mapping of pixels of a rear display to pixels in a front display of a MLD system.

Regarding a refractive beam mapper (RBM), such a beam mapping element is made up of, or includes, a plurality of micro☐lenses and may be used as a stand-alone element for reducing moire interference via pseudo random mapping (e.g., see FIGS. 4-6 and 14-16). In certain example pseudo random mapping embodiments (e.g., FIGS. 4-5), each of the refractive micro☐lenses of an RBM may be designed to direct incident rays from the back LCD 2 to an observer in a defined path, each ray passing through a different sub☐pixel in the front LCD 1 according to a pseudo random mapping. For example, FIG. 4 shows the pseudo random mapping of rear subpixels or pixels of rear display 2 to subpixels or pixels in the front display 1 (the rear display is the left-most display in FIG. 4). The pseudo random mapping is used in order to not introduce extra moiré effects, and can reduce moire interference. In an example embodiment, the divergence of these individual beams is limited so that light from any pixel or subpixel of the rear LCD is not diverted more than one pixel or subpixel distance from a straight line on the front display. Optionally, the RBM may be laminated to the top LCD 1 (see FIGS. 5, 14 and 16), and optionally matched or substantially matched optically to media between the two LCDs with a non☐birefringent material. However, in other embodiments, the refractive beam mapper can be placed anywhere within the LCD stack. FIG. 5 for instance shows the beam mapping element (e.g., RBM including a micro-lens array) located between the front and rear LCDs and laminated to an interior side of the front display.

In certain example embodiments, the micro-lenses of an RBM may be fabricated using gray-scale lithography, to produce arbitrary surface structures in a micro-lens format. Each lens element may configured for directing light in a controlled direction enabling arbitrary and asymmetric scattering angles as shown in FIGS. 4-5. It is possible to make a master to replicate the RBM using a variety of high-volume manufacturing processes and materials as in the replication of micro-lens features, profile slope angle is more important than profile height. FIGS. 4-5 show how the refractive beam mapper superimposes rays from the back LCD 2 onto the front LCD 1 from an observer's point of view. The beam paths are mapped in a pseudo random fashion so not to introduce other artifacts such as extra moiré. The underlying LCD structure 2 is randomized and thus incapable of generating significant moiré interference with the top LCD 1.

Alternatively, a diffuser may instead be used for the construction of a moiré suppression element. While the process can be adapted to make a refractive beam mapper, engineered diffusers can also be used as optimal diffuser elements for more reduction. Diffusers are not as desirable as a refractive beam element.

The refractive beam mapper may exhibit various features. For example, an RBM may exhibit achromatic performance. In addition, an RBM may exhibit arbitrary/asymmetric scattering angles. Further, an RBM may exhibit controlled intensity distribution patterns (e.g., circular, square, rectangular, elliptical, line, ring, etc.). Also, an RBM may exhibit controlled intensity profiles (e.g., flat top, Gaussian, batwing, custom, etc.). An RBM may also exhibit high optical transmission efficiency (e.g., 90 percent). Additionally, an RBM may exhibit the preservation of polarization. An RBM may be of or include various materials, such as polymer injection molding, hot embossed polymers, polymer-on-glass components, etc.

Moiré interference in MLD is commonly suppressed by adding a diffuser element (as opposed to a beam mapping element) between the back LCD and the observer so that the pixel structure in the back LCD is blurred. The greater the diffuser spread the less the moiré but correspondingly the observed resolution of the back LCD is reduced. This becomes an optimization problem and can be described as an image quality cost function IQC which can range from 0 to 4, 0 being perfect and 4 being worst for both moiré and blurring. Factors to consider include contrast=(max−min)/(max+min) where (1 is best, 0 is worst); crosstalk=1− contrast of alternating black and white lines (range 0:1); moiré=contrast of moiré for constant white pattern on both LCD's (range 0:1); IQC=moiré_X+moiré_Y+crosstalk_X+ crosstalk_Y (i.e. range is 0:4), the lower this value, the better. Normally the cost function would have a realistic maximum of approximately 2 as shown by the following limits: no diffuser:moiré_X+moiré_Y=2, crosstalk_X+ crosstalk_Y=0; and strong diffuser:moiré_X+moiré_Y=0, crosstalk_X+crosstalk_Y=2.

Figure 7:
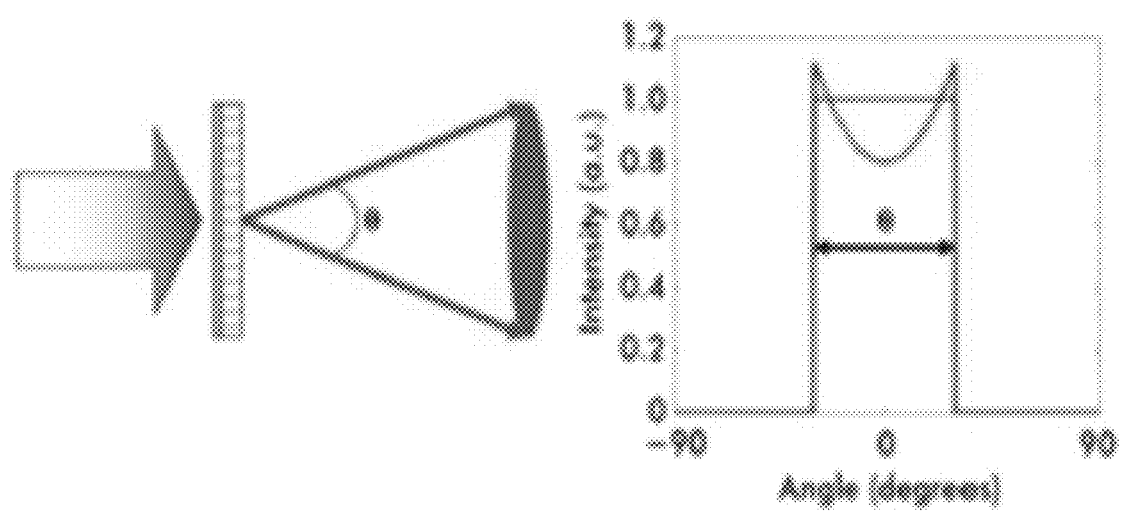
FIG. 7 illustrates a bandwidth limited implementation of a RBM having refractive optics.
Figure 8:
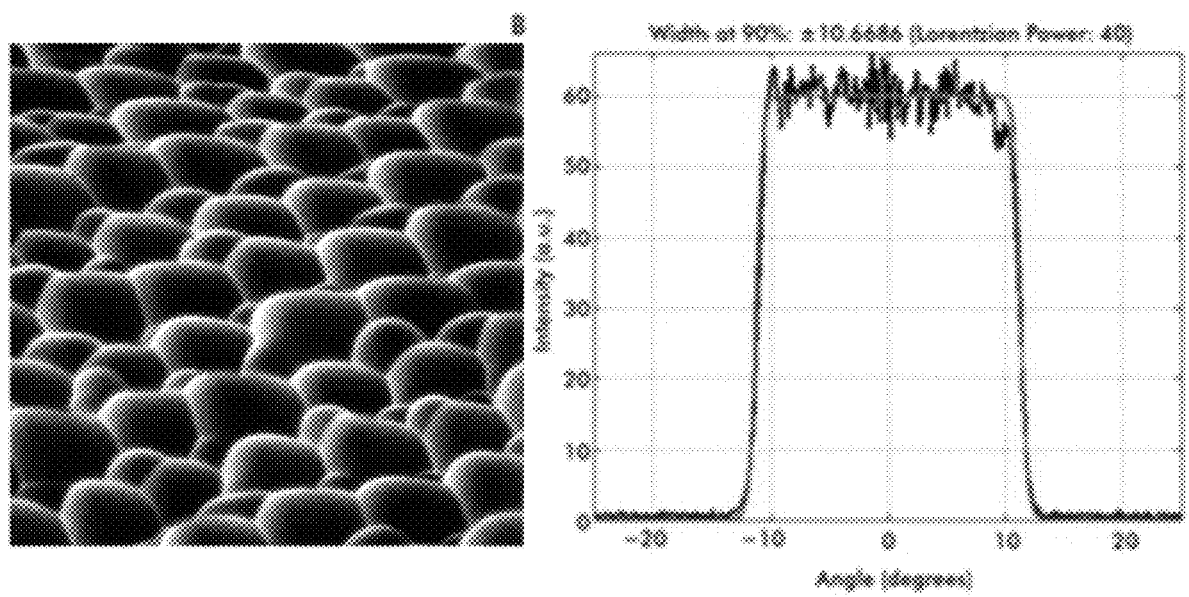
FIG. 8 is an intensity profile exhibiting improved super-Lorentzian characteristics over a range of angles with p=40 and lens feature sizes less than or equal to 160 microns.

FIG. 7 illustrates a bandwidth limited implementation of an RBM having custom refractive optics which are close to a flat top profile, such that the far field pattern is as close as possible to a flat top profile. The prescription for the set of lenses that comprise the distribution is defined, including feature sizes and slope angles based on the scatter requirements. These parameters may be defined in terms of probability distribution functions that specify the likelihood that a certain lens will assume a specific prescription. A spatial distribution of the microlenses to create the surface structure is designed to create the surface structure according to a desired distribution function. It is appreciated that any underlying periodicity in the spatial distribution of the microlenses may be eliminated in certain example embodiments. Also, lens mismatches may be eliminated, wherein lens mismatches can lead to wide-angle scatter, are eliminated. Both of these improvements maximize the use of available light. FIG. 8 shows an intensity profile exhibiting a much improved super-Lorentzian behavior over the entire range of angles with p=40, and lens feature sizes ≤160 μm. The careful pseudo randomization of the surface structure also creates a scatter distribution that is devoid of artifacts and induced moiré. This may be significant as regular patterns can introduce additional moiré interference.

Figure 9:
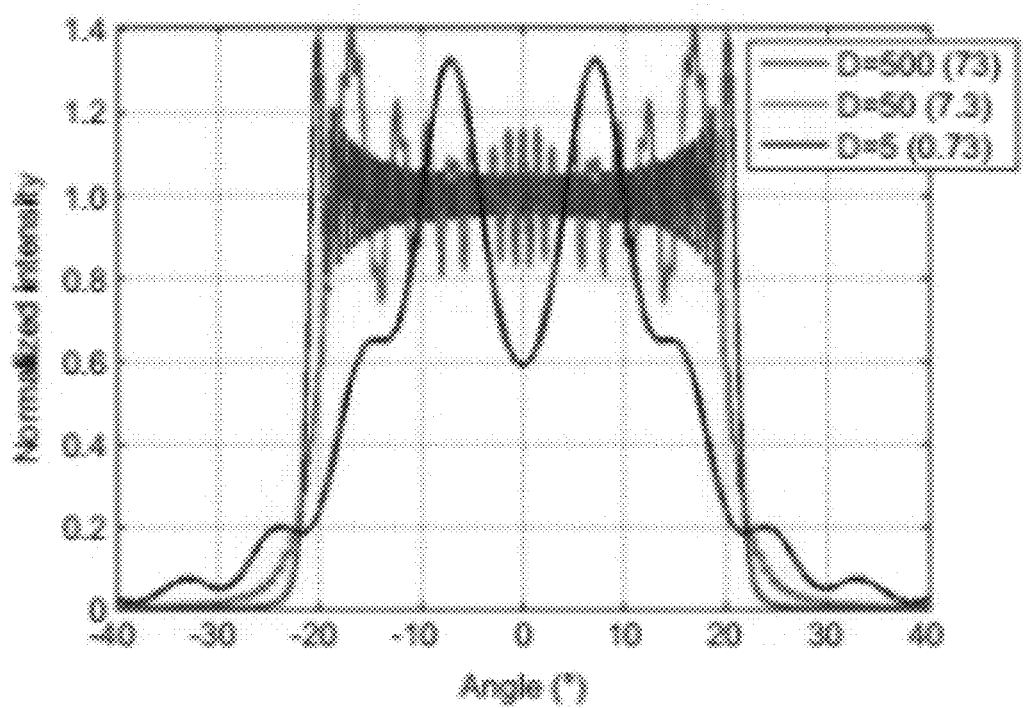
FIG. 9 is a graph illustrating that bigger microlenses will typically have better anti-moiré diffuser profiles.

FIG. 9 shows that there is a tradeoff between microlens size and introduced image artifacts. Bigger microlenses will typically have better anti-moiré diffuser profiles. If the microlenses become of a size that are visible to the naked eye, then extra image artifacts will become apparent. These include sparkle, pixel walking and more interference between the pattern and either or both LCDs. FIG. 9 illustrates PSF for a single microlens for various values of diameters (um). Minimizing feature size may also be utilized in the design of an LCD moiré reduction element. The feature size should ideally be smaller than a sub pixel in order to remain substantially invisible to the naked eye as shown in FIG. 4. In the case where scatter centers take the form of microlenses, the feature size is given by the microlens diameter. In particular, miniature refractive elements are desired. If the microlenses become of a size that are visible to the naked eye then extra image artifacts will become apparent. These include sparkle, pixel walking, and moiré interference between the pattern and either or both LCDs. Sparkle is most often seen in anti-glare displays where the display surface has been treated to produce a matte textured surface. These surface features act as refractive or diffractive elements and can either focus or defocus individual pixel elements depending on the viewer position leading to intensity variations or sparkle. Pixel walking is the result of the refractive distortion appearing to move and distort the individual pixels and the viewer moves position. Extra moiré interference is introduced when regular features in the array of microlens "beat" with one or both of the LCDs. Randomization and reduction of lens size in an RBM or diffuser and placement reduce these extra moiré artifacts. There are two factors to consider in this regard, sag and averaging. To ensure the best uniformity and reduction in moiré, a large number of scatter centers should be illuminated within each pixel area as shown in FIG. 4. At the same time, for a certain set of parameters (e.g., spread angle, index of refraction, and conic constant), the lens depth decreases as the microlens diameter decreases. If the process continues, a diffractive regime is eventually reached where the lens depth only imparts a phase delay that is a small fraction of $2\pi$. In this respect, it is useful to define the phase number in the following equation:

$$M = \frac{y_{max}}{\left(\frac{\lambda}{\Delta n}\right)}.$$

In the above equation, ymax represents the total lens sag, $\lambda$ is the wavelength under consideration, and $\Delta n$ equals $n(\lambda)1$, with n the index of refraction at wavelength $\lambda$, for an element in air. The phase number basically expresses the total sag in the language of phase cycles and defines the regime, diffractive or refractive, the microlens operates on: M=1 implies a diffractive element with exactly $2\pi$ phase shift. In one embodiment, for a microlens to operate in the refractive regime, as is desirable for an achromatic component with high target efficiency, the phase number M should be as large as possible.

Consider again the case of a microlens that scatters a collimated beam with a 40° spread. As the diameter gets smaller the farfield scatter shows coarser oscillations and more sloped falloff, translating into lower target efficiency. A simple rule of thumb to help decide the minimum feature size or lens diameter to utilize is given by the following equation.

$$D \geq 230M\frac{\lambda}{\theta}.$$

In the above equation, $\theta_0$ is the halfwidth beam spread angle in degrees (in air). To be well within the refractive regime, M should be around 8 or more. Assuming $\theta=2°$ and $\lambda=0.633$ μm, and M=8, a result for D≥582 μm is obtained, which is too large compared with a 200 um pixel and will be very visible, degrading the image. Increasing the spread to 20 degree will reduce D by a factor of 10 to 58 μm. In the above equation, the closer the diffuser is to the back panel, the greater the FWHM angle $\theta_0$. The equation also gives a rule of thumb of microlens diameter to $\theta_0$.

Embedding the refractor in a medium of higher refractive index (RI) such as silicon OCA, rather than air, allows for the effective use of a wider angle refractor, as the higher RI will reduce the refractive power of each microlens. With an RI=1.42, $\theta_0$ equates to an angle of $\theta=\sim11°$ or by the above referenced equation, D≥105 μm which is more acceptable. In one embodiment, embedding in high RI material effectively reduces the microlens diameter, which results in less image artifacts. Specifically, replacing the air between the two panels with an indexed matched medium will also allow smaller divergence angles as measured in air and thus smaller microlens diameters.

Figure 10:
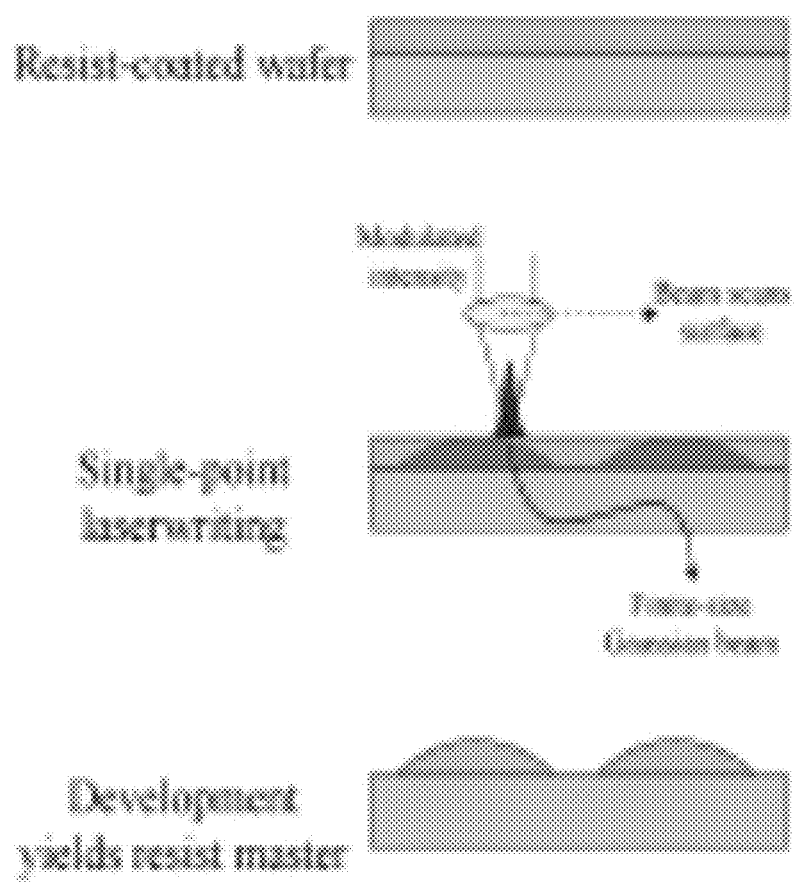
FIG. 10 is a schematic diagram illustrating an example fabrication processes for a RBM that may be used in various embodiments of this invention.

FIG. 10 shows the fabrication process of an RBM, in accordance with one embodiment of the present disclosure in the above respects, including the formation of microlenses on a wafer support. The RBM may be embedded in high RI material to reduce Fresnel depolarization, in order to improve image contrast of the MLD.

Figure 11:
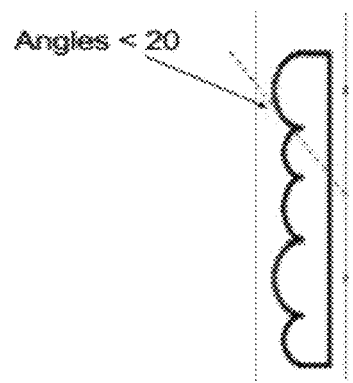
FIG. 11 illustrates a microlens according to an example embodiment of this invention.
Figure 12:
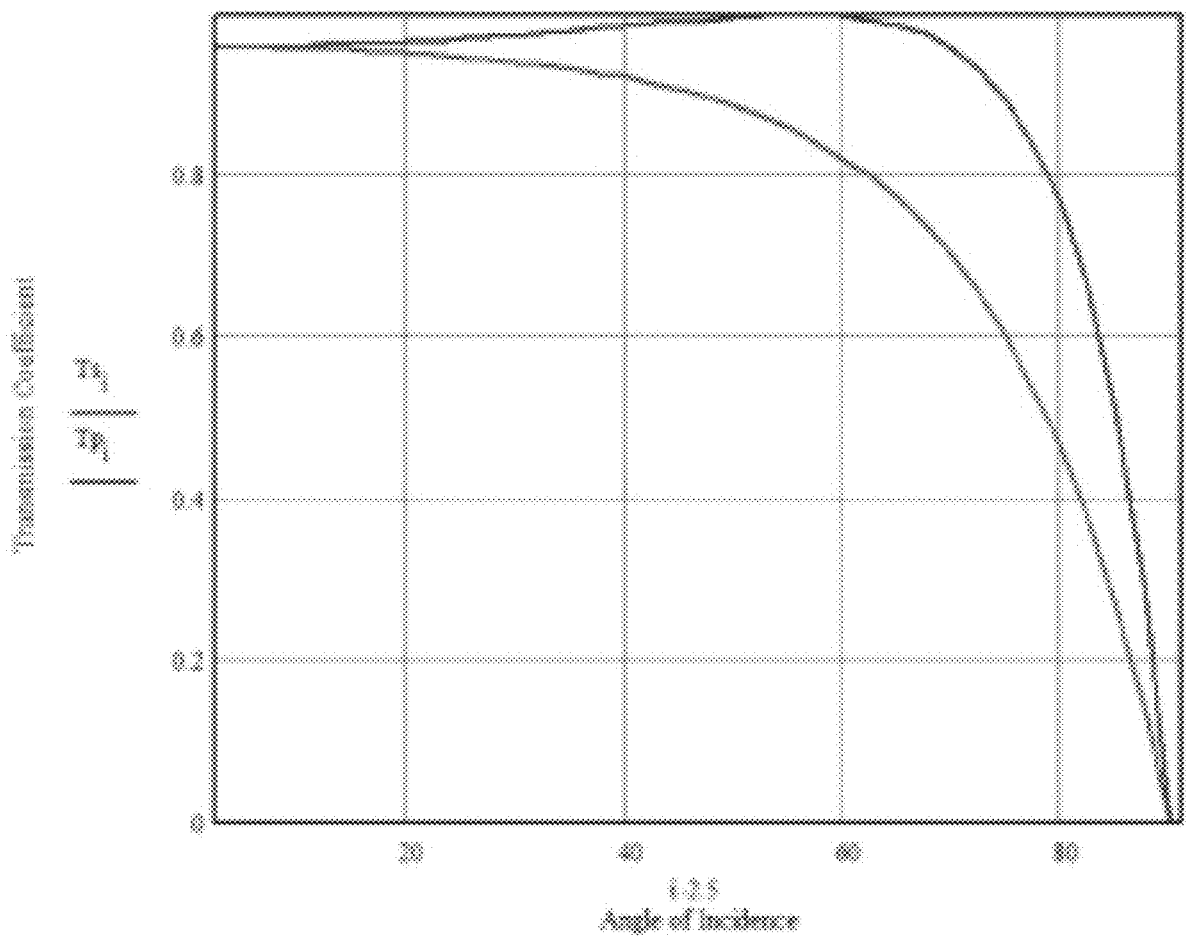
FIG. 12 is an angle of incidence vs. transmission coefficient graph that shows curves illustrating the transmission coefficient for S and P waves vs. angle of incidence.
Figure 13:
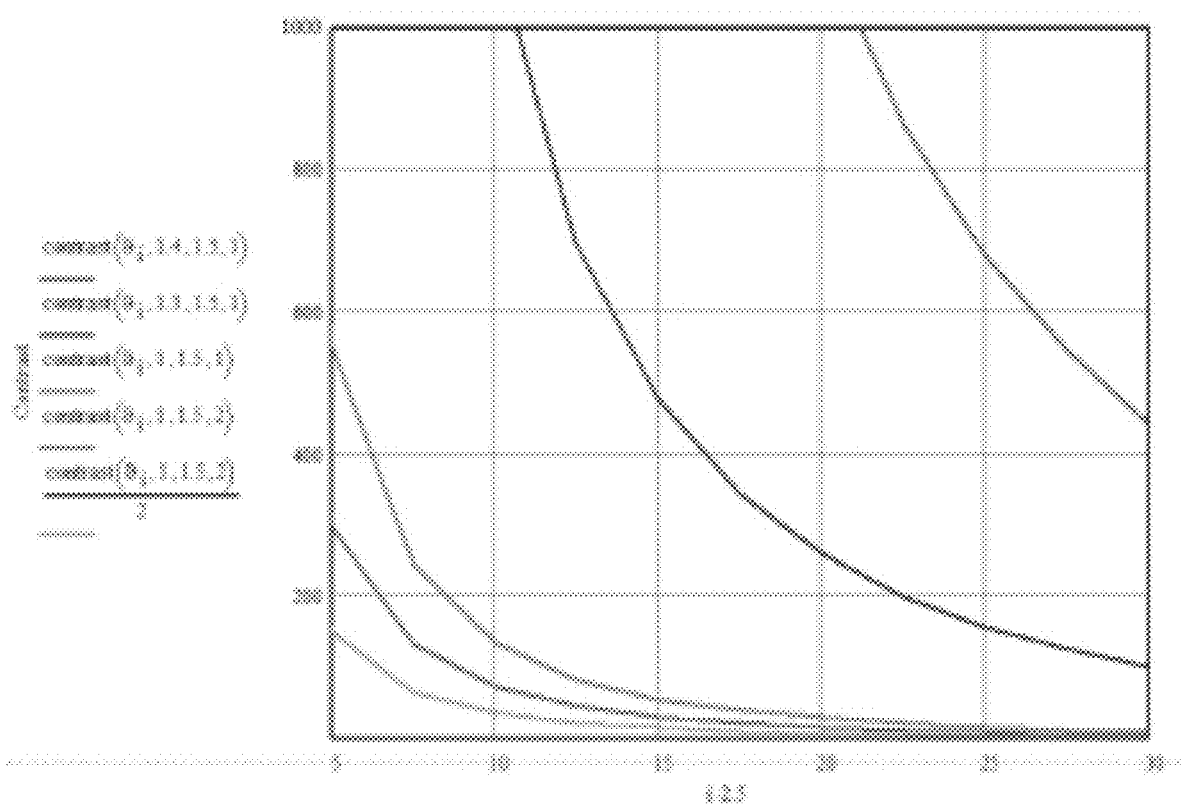
FIG. 13 is a graph showing system contrast (contrast ($\theta i$, n1, n2, N), wherein $\theta i$ is the angle of incidence, n1 is the refractive index of the material between LCDs, n2 is the refractive index of glass, and N is the number of interfaces.

FIG. 11 shows a microlens surface, which typically has a distribution of surface normals between 0 and approximately 20 degrees. The distribution of surface normals leads to contrast reduction because S and P polarizations are transmitted with different attenuations. FIG. 12 shows curves illustrating the transmission coefficient for S and P waves vs. angle of incidence, and FIG. 13 shows system contrast (contrast ($\theta$i, n1, n2, N), wherein $\theta$i is the angle of incidence, n1 is the refractive index of the material between LCDs, n2 is the refractive index of glass, and N is the number of interfaces. As shown the line to the far right with the RI at 1.4 and 1.5 shows the best contrast as the Fresnel depolarization is the least.

Figure 14:
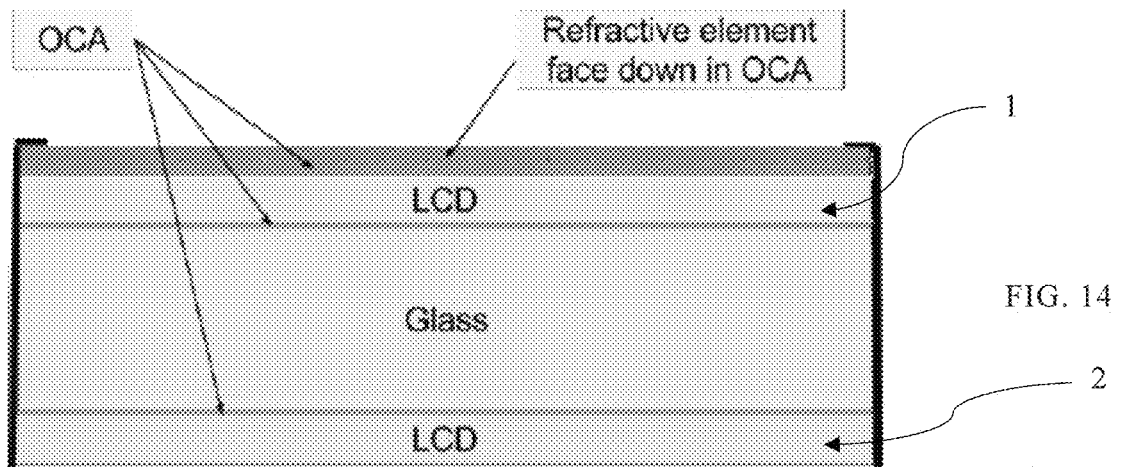
FIGS. 14-16 are side cross sectional views of a MLD system according to embodiments of this invention where a moire reducing element (e.g., RBM) is placed in various locations of a stack in a MLD system according to various embodiments of this invention (this may or may not be used in combination with sub-pixel compression in various embodiments of this invention).
Figure 15:
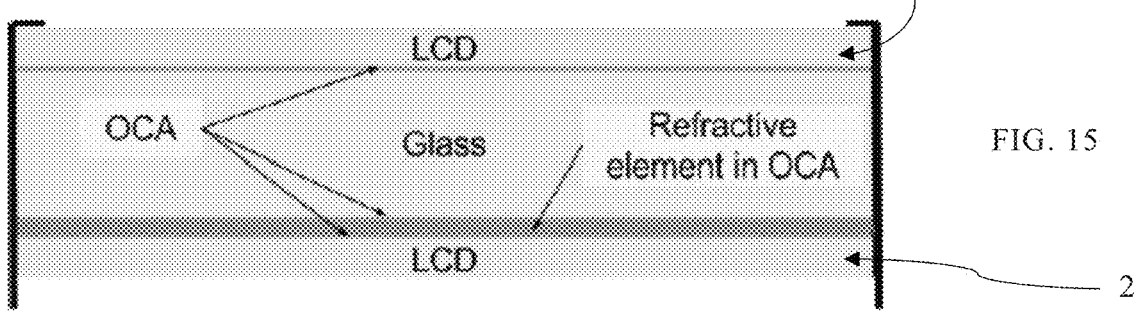
Figure 16:
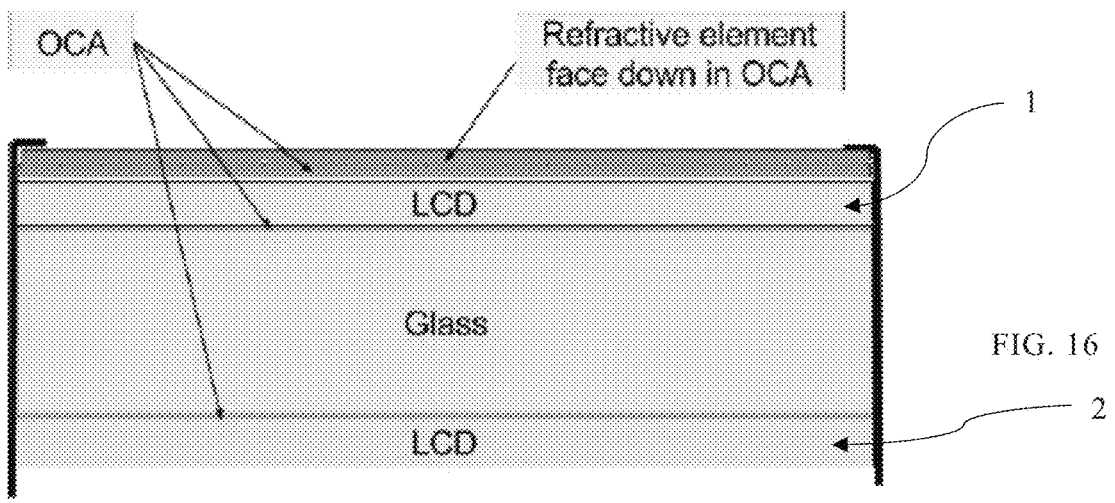

FIGS. 14-16 show various placements of the moiré reduction element (e.g., refractive element such as RBM). In FIGS. 14 and 16 for example, the moiré reduction element could be positioned on the top surface of the front display 1 as a laminatable film with the patterned surface facing downwards to get the feature size small, as previously described. These embodiments may or may not be used in combination with subpixel compression techniques. In one embodiment, having the patterned surface facing upwards would also act as an anti-glaring mechanism, but it will be necessary to embed in optical coupling adhesive (OCA) with a refractive index of approximately 1.5 to achieve a feature size smaller than 70 μm. Alternatively, as shown in FIG. 15, it is also possible to place the moiré reduction element between two LCDs (e.g., laminated to the rear display) where the divergence will be larger, and thus the feature size smaller. Index matching the internal voids with a material of R.I. greater than 1.4 (see OCA) will greatly reduce Fresnel depolarization, thereby improving contrast and reducing reflections. The internal voids index matched with glass and OCA to reduce Fresnel polarization also improve contrast and reduce reflections. In one embodiment, the FWHM width for this implementation may be about 1.8 degrees, with a square profile.

Figure 17:
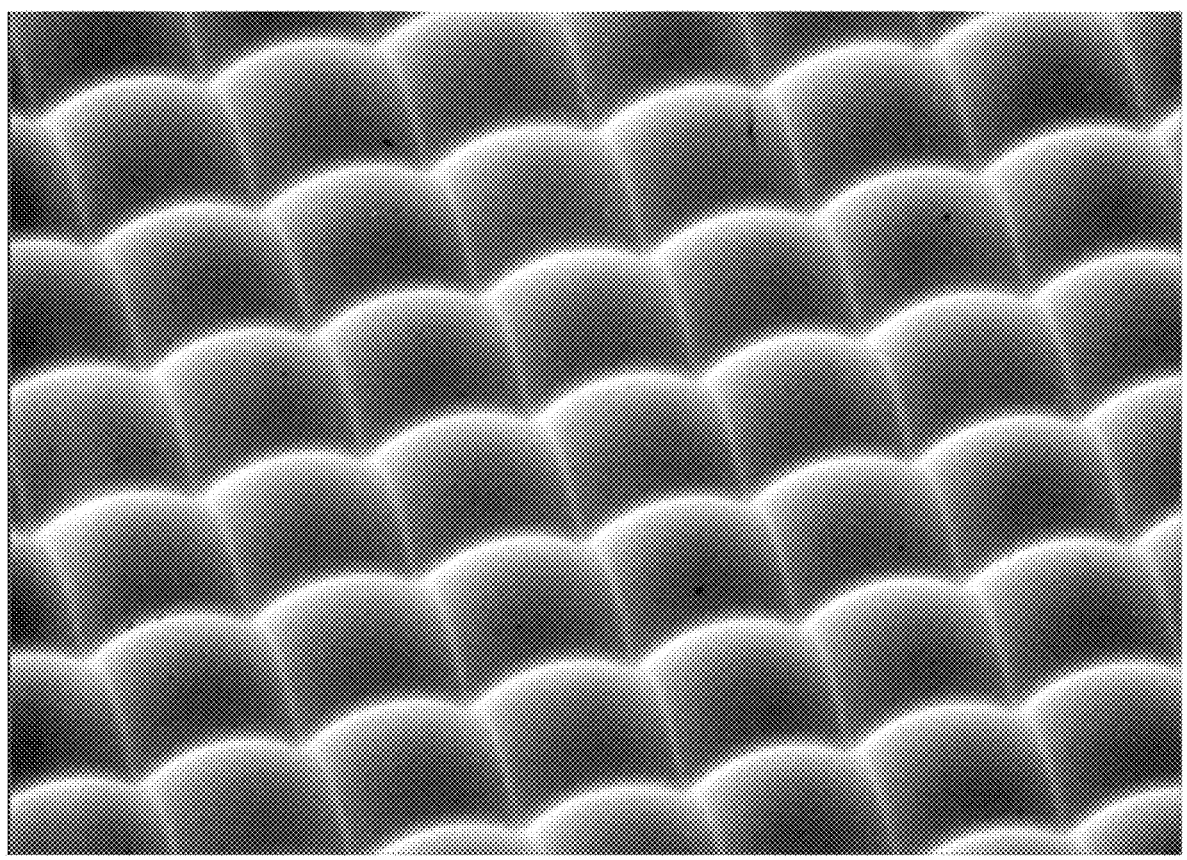
FIG. 17 is a plan view of a diffuser including square profile microlenses that may be used as a moire reducing element (e.g., RBM) in any embodiment herein such as in any of FIGS. 4-7, 14-16.

It has surprisingly been found that use of a square diffuser profile (e.g., as viewed from above), as shown in FIG. 17, has advantageous technical qualities in connection with refractive beam mappers described herein, according to any embodiment of the instant disclosure. In other words, a square profile diffuser such as shown in FIG. 17 may be used for any of the refractive beam mappers in this disclosure, in certain example embodiments of this invention. A beam mapping element including an array of square microlenses such as that shown in FIG. 17 may be made, for example, by projecting a shaped laser beam into a photoresist, so that each microlens is a copy of the prior, in certain example instances. The beam mapping element of FIG. 17 may be used in any embodiment herein, such as for the refractive beam mapper in any of FIGS. 4-7, 14-16.

Figure 18:
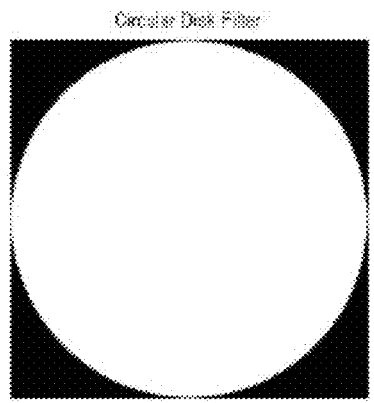
FIG. 18 is a plan view representative of a perfect circular filter kernel.
Figure 19:
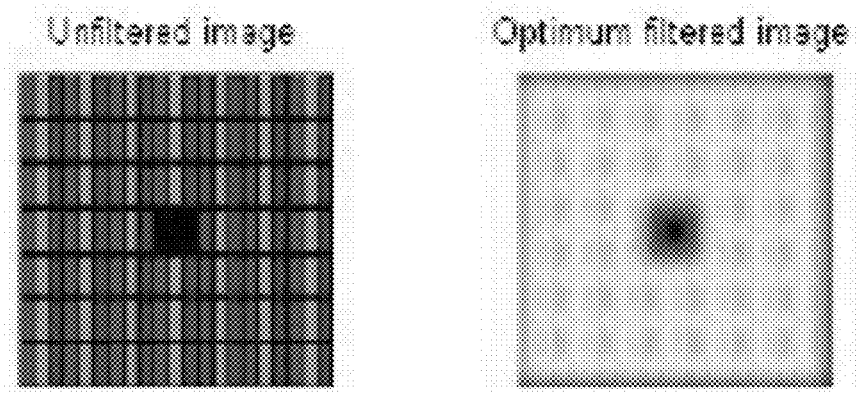
FIG. 19 varies the radius of a circular kernel with respect to image quality.
Figure 19:
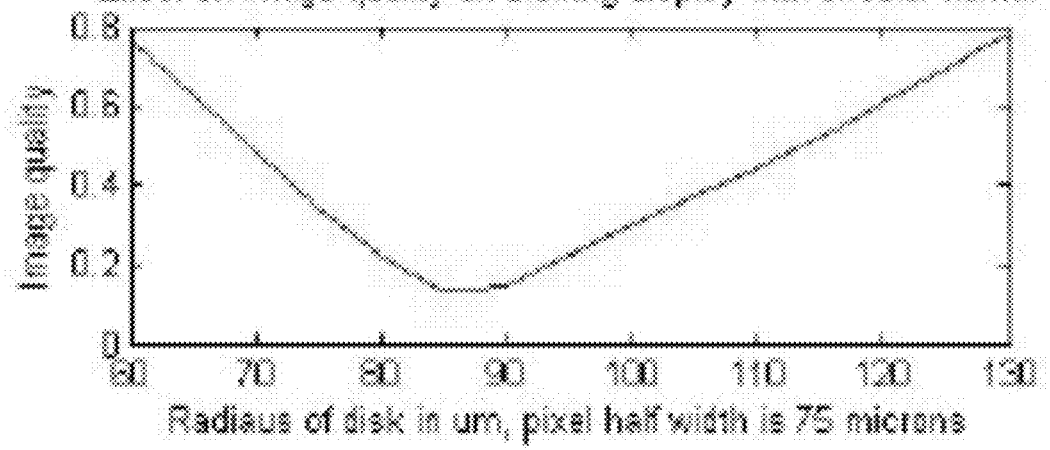

FIG. 18 is, for purposes of comparison, representative of a perfect circular filter kernel—that is there is no energy outside the boundary of the circle. This kernel is convolved with an image of a pixel to determine the point spread of the system impulse response—a single black pixel. In FIG. 19, the radius of the circle is varied and applied to the image to determine the optimum. The blue line below is representative of total image quality and incorporates the blur and residual pixel moiré. Note the minimum of the function is optimum. As can be seen in the pixel image to the top right in FIG. 19, a circular kernel never completely quells the sub-pixel structure. This in turn would give rise to some residual moiré in the MLD system.

Figure 20:
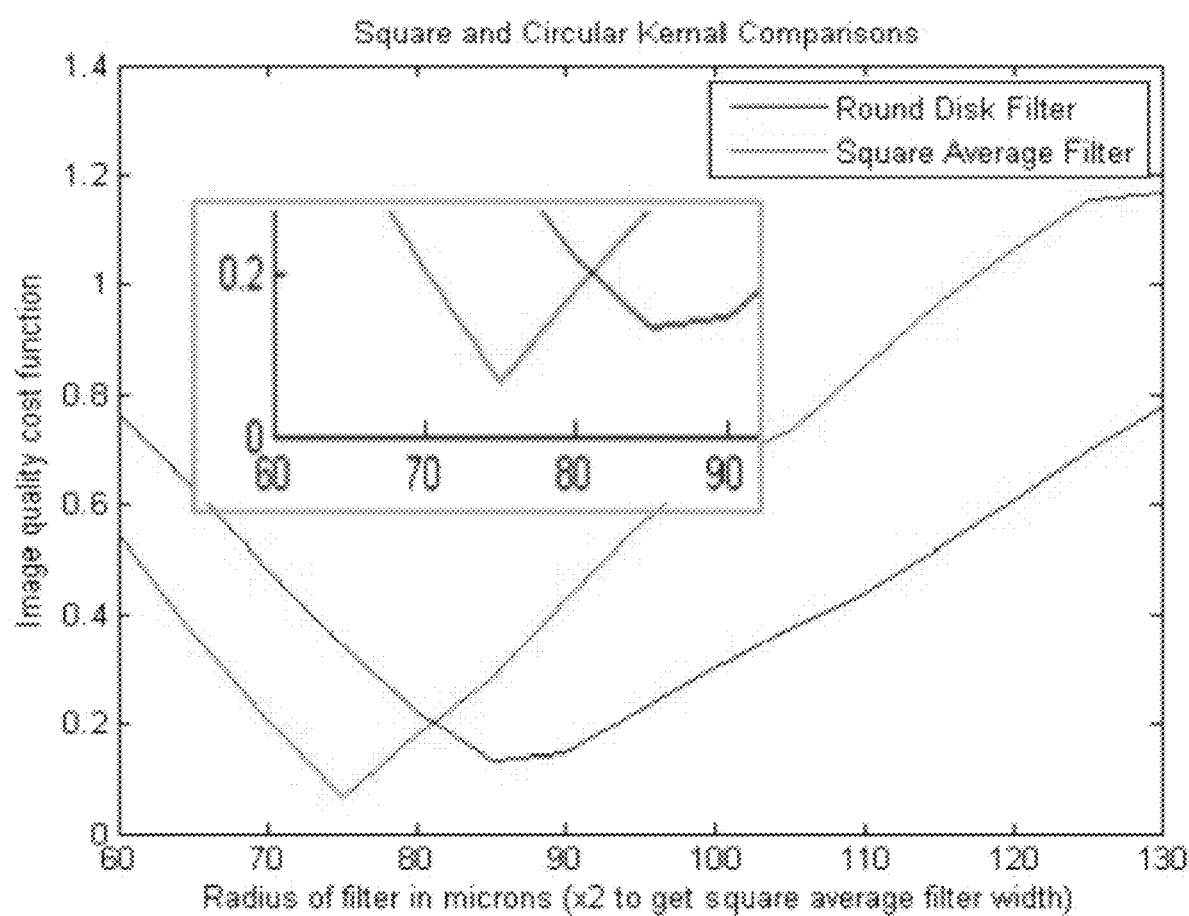
FIG. 20 is a graph comparing square and circular kernel comparisons (for microlens profiles) with respect to image quality.

In contrast, a square or substantially square shape (e.g., see FIG. 17) will completely or substantially remove any residual moire in a MLD system. FIG. 20 shows a comparison between the square average filter (e.g., line trending higher to the right) and the round disk filter. Note that model pixels are 150 microns high/wide, and so the optimum square filter kernel has the same size and width as the pixel as viewed from above. It can be seen in FIG. 20 that the square shaped diffuser profile has improved image quality cost function compared to the circular shape. The far field profile of the diffuser affects cost function. A square engineered diffuser is almost twice as good as a round diffuser. In FIG. 20, IQC is shown for round and square profiles using 150 μm diameter (length and width) pixels. The cost is minimized for the square case when the entire pixel is covered (i.e., the square radius=75 μm or width=150 μm).

In square lens profile embodiments, the microlenses are characterized by a phase number M of 8 or more, more preferably of 16 or more, and it has been found that this improves image quality.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In example embodiments of this invention, there is provided a display device comprising: a first display in a first plane for displaying a first image; a second display in a second plane for displaying a second image, wherein said first and second planes are approximately parallel to each other; a beam mapping element located between the first and second displays and comprising a plurality of microlenses configured to direct rays output from the second display through sub-pixels of the first display and toward a viewer, wherein the microlenses each have a substantially square profile as viewed from above in order to improve image quality.

In the display device of the immediately preceding paragraph, the beam mapping element may comprise a refractive beam mapper.

In the display device of any of the preceding two paragraphs, the beam mapping element may be configured to direct rays output from the second display in a pseudo random manner through sub-pixels of the first display and toward a viewer.

In the display device of any of the preceding three paragraphs, the beam mapping element may have asymmetric scattering angles.

In the display device of any of the preceding four paragraphs, the beam mapping element may substantially preserve polarization.

In the display device of any of the preceding five paragraphs, the beam mapping element may have refractive optics for realizing substantially a flat top profile, such that a far field pattern of output is close to a flat top profile.

In the display device of any of the preceding six paragraphs, the beam mapping element may limit divergence from any point on the second display to less than a distance of one pixel offset when the rays proceed through the first display.

In the display device of any of the preceding seven paragraphs, each of the microlenses may have a diameter no greater than a length and/or a width of a subpixel in the second display.

In the display device of any of the preceding eight paragraphs, the microlenses may be characterized by a phase number M of 8 or more.

In the display device of any of the preceding nine paragraphs, the microlenses may have a distribution of surface normals between 0 and approximately 20 degrees.

In the display device of any of the preceding ten paragraphs, the beam mapping element may be laminated to the second display.

In the display device of any of the preceding eleven paragraphs, curved surfaces of the microlenses face a viewer and/or contact a refractive index material having a refractive index of at least 1.4.

In the display device of any of the preceding twelve paragraphs, the second display may be a rear display, and the first display may be a front display, of the display device.

In the display device of any of the preceding thirteen paragraphs, rays from a given subpixel in the second display may be directed toward multiple different subpixels of the first display, and rays from a plurality of different subpixels of the second display may proceed through a given subpixel of the first display.

Embodiments according to the present disclosure are thus described. While the present disclosure has been described in particular embodiments, it should be appreciated that the disclosure should not be construed as limited by such embodiments.

The invention claimed is:

1. A display device comprising:
a first display in a first plane for displaying a first image;
a second display in a second plane for displaying a second image, wherein said first and second planes are approximately parallel to each other;
a beam mapping element located between the first and second displays and comprising a microlens array including a plurality of microlenses configured to direct rays output from the second display through sub-pixels of the first display and toward a viewer, wherein each of the microlenses in the array has a substantially square profile as viewed from above, from a point of view of a viewer normal to the display device, in order to improve image quality, and
wherein each of the microlenses has a phase number M of at least 8 and a width substantially the same as a width of a corresponding pixel in at least one of the displays, and covers the pixel.

2. The display device of claim 1, wherein the beam mapping element comprises a refractive beam mapper.

3. The display device of claim 1, wherein the beam mapping element is configured to direct rays output from the second display in a pseudo random manner through sub-pixels of the first display and toward a viewer.

4. The display device of claim 1, wherein the beam mapping element has asymmetric scattering angles.

5. The display device of claim 1, wherein the beam mapping element substantially preserves polarization.

6. The display device of claim 1, wherein the beam mapping element has refractive optics for realizing substantially a flat top profile, such that a far field pattern of output is close to a flat top profile.

7. The display device of claim 1, wherein the beam mapping element limits divergence from any point on the second display to less than a distance of one pixel offset when the rays proceed through the first display.

8. The display device of claim 1, wherein each of the microlenses has a diameter no greater than a length and/or a width of a subpixel in the second display.

9. The display device of claim 1, wherein the microlenses have a distribution of surface normals between 0 and approximately 20 degrees.

10. The display device of claim 1, wherein the beam mapping element is laminated to the second display.

11. The display device of claim 1, wherein curved surfaces of the microlenses contact a refractive index material having a refractive index of at least 1.4.

12. The display device of claim 1, wherein the second display is a rear display, and the first display is a front display, of the display device.

13. The display device of claim 1, wherein rays from a given subpixel in the second display are directed toward multiple different subpixels of the first display, and wherein rays from a plurality of different subpixels of the second display proceed through a given subpixel of the first display.

14. A method of displaying an image via a display device including a first display in a first plane for displaying a first image, and a second display in a second plane for displaying a second image, wherein said first and second planes are approximately parallel to each other, the method comprising;

directing light rays output from the second display through sub-pixels of the first display and toward a viewer, via a plurality of microlenses each having a substantially square profile as viewed from the point of view of a viewer, the microlenses being located between the first and second displays, and wherein each of the microlenses has a phase number M of at least 8 and a width substantially the same as a width of a corresponding pixel in at least one of the displays, and covers the pixel.

15. The method of claim 14, wherein the microlenses are laminated to the second display.

16. The method of claim 14, wherein the second display is a rear display, and the first display is a front display, of the display device.

17. The method of claim 14, wherein rays from a given subpixel in the second display are directed toward multiple different subpixels of the first display, and wherein rays from a plurality of different subpixels of the second display proceed through a given subpixel of the first display.

* * * * *